United States Patent
Brouard et al.

(10) Patent No.: US 12,286,377 B2
(45) Date of Patent: Apr. 29, 2025

(54) PROCESS OF PREPARING A CEMENTED PASTE BACKFILL MATERIAL

(71) Applicant: HOLCIM TECHNOLOGY LTD, Zug (CH)

(72) Inventors: Eric Brouard, Holderbank (CH); Olivier Watt, Holderbank (CH); Delphine Thomas, Holderbank (CH); Antoine Creyx, Holderbank (CH)

(73) Assignee: HOLCIM TECHNOLOGY LTD, Zug (CH)

( * ) Notice: Subject to any disclaimer, the term of this patent is extended or adjusted under 35 U.S.C. 154(b) by 696 days.

(21) Appl. No.: 17/618,153

(22) PCT Filed: Jun. 10, 2020

(86) PCT No.: PCT/IB2020/055441
§ 371 (c)(1),
(2) Date: Dec. 10, 2021

(87) PCT Pub. No.: WO2020/250141
PCT Pub. Date: Dec. 17, 2020

(65) Prior Publication Data
US 2022/0259104 A1    Aug. 18, 2022

(30) Foreign Application Priority Data

Jun. 12, 2019 (EP) .................. 19290036

(51) Int. Cl.
| | |
|---|---|
| *C04B 28/08* | (2006.01) |
| *C04B 18/12* | (2006.01) |
| *C04B 24/00* | (2006.01) |
| *C04B 24/26* | (2006.01) |
| *C04B 24/32* | (2006.01) |
| *C04B 24/38* | (2006.01) |
| *C04B 28/04* | (2006.01) |
| *C04B 40/00* | (2006.01) |
| *C04B 103/32* | (2006.01) |
| *C04B 103/50* | (2006.01) |
| *C04B 111/00* | (2006.01) |

(52) U.S. Cl.
CPC .............. *C04B 28/08* (2013.01); *C04B 18/12* (2013.01); *C04B 24/003* (2013.01); *C04B 24/2647* (2013.01); *C04B 24/32* (2013.01); *C04B 24/38* (2013.01); *C04B 28/04* (2013.01); *C04B 40/0042* (2013.01); *C04B 2103/32* (2013.01); *C04B 2103/50* (2013.01); *C04B 2111/00724* (2013.01)

(58) Field of Classification Search
CPC ......... C04B 28/08; C04B 28/04; C04B 18/12; C04B 24/32; C04B 24/00; C04B 24/26; C04B 24/38; C04B 40/00
USPC .............................................. 524/4
See application file for complete search history.

(56) References Cited

U.S. PATENT DOCUMENTS 6,297,295 B1    10/2001  Gay et al.
2015/0239782 A1* 8/2015  Purcell, Jr. ............... C04B 18/12
                                                                    106/713

FOREIGN PATENT DOCUMENTS

| | | | | |
|---|---|---|---|---|
| CN | 107418312 A | * | 12/2017 | ........... C09D 125/14 |
| EP | 1655272 A1 | * | 5/2006 | ......... C04B 24/2647 |
| EP | 3 110 729 A1 | | 1/2017 | |
| JP | 2012201561 A | * | 10/2012 | |
| WO | WO 2015/127360 A1 | | 8/2015 | |
| WO | WO 2015/164943 A1 | | 11/2015 | |

OTHER PUBLICATIONS

International Search Report as issued in International Patent Application No. PCT/IB2020/055441, dated Aug. 20, 2020.
Ouattara, D., et al., "Effect of superplasticizers on the consistency and unconfined compressive strength of cemented paste backfills," Construction and Building Materials, , vol. 181, Aug. 2018, pp. 59-72.
Yang, L., et al., "Effect of superplasticizer type and dosage on fluidity and strength behavior of cemented tailings backfill with different solid contents," Construction and Building Materials, vol. 187, Oct. 2018, pp. 290-298.
Panchal, S., et al., "Variability in rheology of cemented paste backfill with hydration age, binder and superplasticizer dosages," Advanced Powder Technology, vol. 29, No. 9, Sep. 2018, pp. 2211-2220.
Niroshan, N., et al., "Flow Characteristics of Cemented Paste Backfill," Geotechnical and Geological Engineering, vol. 36, No. 4, Jan. 2018, pp. 2261-2272.

* cited by examiner

*Primary Examiner* — Deve V Hall
(74) *Attorney, Agent, or Firm* — Pillsbury Winthrop Shaw Pittman LLP

(57) ABSTRACT

A process of preparing a cemented paste backfill material, the material including ground mine tailings, a hydraulic binder and water, wherein the solids content of the backfill material is 70-82 wt.-%, the process including a) providing a dry premix, the premix including the hydraulic binder, a superplasticizer and optionally a defoaming agent, b) mixing the dry premix with the ground mine tailings and water.

19 Claims, 2 Drawing Sheets

PROCESS OF PREPARING A CEMENTED PASTE BACKFILL MATERIAL

CROSS-REFERENCE TO RELATED APPLICATIONS

This application is the U.S. National Stage of International Application Serial No. PCT/IB2020/055441, filed Jun. 10, 2020, which in turn claims priority to European Application No. 19 290 036.3, filed Jun. 12, 2019. The contents of all of these applications are incorporated herein by reference in their entirety.

FIELD OF THE INVENTION

The invention relates to a process of preparing a cemented paste backfill material for the mining industry, said material comprising ground mine tailings, a hydraulic binder and water, wherein the solids content of the backfill material is 70-82 wt.-%, preferably 74-80 wt.-%.

BACKGROUND OF THE INVENTION

In mining operations, an ore is extracted and is treated to separate the valuable elements from the uneconomic fraction, the gangue. The ore is treated both mechanically and chemically, and in most cases it is ground into particles. The resulting ground gangue is referred to as tailings, which consist of a slurry composed of fine particles, ranging from the size of a grain of fine sand to a few micrometres. Mine tailings are usually produced from the mill in slurry form, which is a mixture of fine mineral particles and water. Some chemicals that are used to extract elements of interest from the ore may also remain in the slurry.

The target elements to be extracted being at a low concentration in the ore, high amounts of tailing are generated and need to be managed and disposed of in the mine or in a process plant that is located underground or above ground.

Conventional tailings slurries have a relatively low solid content, normally ranging from 20 wt.-% to 60 wt.-% solids. To facilitate transport and storage of the tailings, and to reduce the related costa, the solid content may be increased and/or thickeners may be added to reduce phase separation in the slurry. This approach is referred to as paste backfill, and the material is then characterised by a pulp density, referring to its solid content.

One way of storing mine tailings is by backfilling, where a hydraulic binder, most often a Portland cement, is mixed with mine tailings to prepare a cemented paste backfill which is then gravity fed or pumped into unused cavities in a mine and left to harden.

As mentioned above, conventional tailings slurries have a relatively low solid content, normally ranging from 20 wt.-% to 60 wt.-%. To make cemented paste backfill, slurries need to be dewatered with thickeners and various types of presses to increase the solid content up to 70-82 wt.-%.

Backfilling with cemented paste backfill having a high solid content results in improved mechanical properties of the backfilled material. Backfilled stopes provide ground stabilisation and permit mining of the adjacent stopes in a shorter period of time when compared to other backfilling techniques, while reducing the amount of tailings for surface disposal.

The mechanical strength of cemented paste backfill can be improved by reducing the moisture content of the paste, i.e. by increasing its solid content. However, this results in deteriorated rheological behaviour of the paste. Therefore, a typical problem of backfill material is related to its transportation, more specifically to the ability of the material to be gravity fed or pumped, sometimes over long distances, and ultimately stored. The rheological properties that render the material pumpable over relatively long distances (often several kilometres in mining operations) are then critical features.

Several patents disclose methods to address these issues, some of them being described below. All these patents have in common the use of specific admixtures to increase the pumpability of the tailings, or reduce the segregation of the solid fraction in the slurry. Foaming agents are often used for that purpose, as the bubbles they create improve the pumpability of the slurry. Thickeners reduce the risk of segregation in the slurry.

U.S. Pat. No. 6,297,295 discloses a method for excavating solid particles such as mine tailings, incorporating a foaming agent into the mixture, and then forming a foam within the mixture to facilitate the transportation of the material through pipelines or boreholes. In addition, a defoaming agent, may be subsequently added to the transported slurry, which will cause the foam to collapse, thus removing most of the air voids from the foamed material. This method however remains complex to implement in mining operation, as several types of chemicals need to be added at different points of the process.

WO 2015/164943 A1 discloses a method of providing a backfill for mine which comprises a binder, water and a foaming agent. The document teaches that, adding a foaming agent has several advantages such as a reduction of weight of the backfill material, a reduction of water consumption, and an improvement of its rheology.

EP 3110729 A1 discloses a backfill material composed of mine tailings, cementitious binder, and an additive, attapulgite, to increase the rheological properties of the backfill material.

As already mentioned, the strength of the backfilling materials once hardened can be low, especially if the mine tailings have a relatively low solid content. Increasing the strength of the hardened backfilling material is of benefit for stability and durability purposes. On the other hand, the cement content of the backfill material is usually kept at a minimum in order to reduce the costs.

Also adding an admixture in very small amount in a cemented paste backfill is never accurate and easy to be done in mining operations. This addition requires special dosing equipment that is most often not used in standard mining operations. An error in the dosage of the admixtures, either an over or an under dosage, can heavily impact the fluidity of the cemented paste backfill, leading to damages to the pipelines.

The purpose of the invention is to provide a simple and cost effective method to process mine tailings, which also enables to have high strength values in the final hardened backfill material. It is a purpose of this invention to remedy the technical problems defined above.

DESCRIPTION OF THE INVENTION

Figure 1:
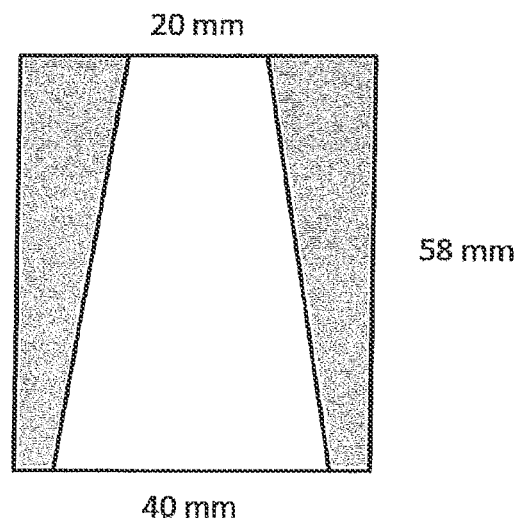
FIG. 1 schematically describes a cone for measuring the fluidity of the paste.

The present invention aims at solving these problems by providing a method of preparing a cemented paste backfill material, said material comprising ground mine tailings, a hydraulic binder and water, wherein the solids content of the backfill material is 70-82 wt.-%, preferably 74-80 wt.-%, the process comprising the steps of:
- a) providing a dry premix, said premix comprising the hydraulic binder, a superplasticizer and optionally a defoaming agent,
- b) mixing said dry premix with the ground mine tailings and water.

The invention is based on the idea to provide a dry premix that contains the admixtures which improve the rheological properties of the backfill material while ensuring a sufficient strength of the backfill once hardened.

As to the theological properties, the premix contains a superplasticizer. Superplasticizers are water reducers that are capable of reducing water contents of mixing water, for a given workability, by up to 30% by weight of cemented paste backfill while maintaining suitable fluidity, or that are capable of improving the flowability of the material for a given water content.

The addition of any superplasticizer and the transportation process over long distances can make air bubbles trapped into the cemented paste backfill. These air bubbles have detrimental effects on the strength of the cemented paste backfill. In order to improve the strength of the backfill once hardened, the premix optionally comprises a defoaming agent. The defoaming agent results in a reduction of the air content of the backfill material and thus in an increased density. In particular, the combination of a superplasticizer and a defoaming agent is especially useful in order to decrease the amount of air that is entrained in the mixture as a result of the addition of the superplasticizer.

To sum up, the invention significantly improves the flowability and the stability of high density cemented paste backfill material for underground backfill applications while maintaining suitable mechanical properties. The fluidity of the cemented paste backfill is suitable for gravity feeding the cemented paste backfill without having to use pumps. It also allows increasing the solids content of the backfill material so as to improve its mechanical properties while maintaining flowability compatible with gravity feed so that no pumps are required.

Further, an advantage of the invention is that the premix is designed as a dry mass, so that it can be stored for long times after having been pre-manufactured. In particular, providing the superplasticizer and optionally the defoaming agent as a dry component of the premix, reduces the number of components to be mixed together at the operation site. In fact, only three types of components need to be mixed on site, namely the dry premix, the mine tailings and water.

According to the invention, the premix is provided in dry form. This includes embodiments, in which the residual water content of the premix is up to 10 wt.-%, preferably up to 5 wt.-%. For example, the water content may be the result of a mixture of a dry hydraulic binder with a small amount of superplasticizer or a defoaming agent that is provided in liquid form. AS known to the person skilled in the art, a small amount of liquid admixture, such as a superplasticizer or a defoaming agent, may be mixed with a particulate hydraulic binder in different ways in order to obtain a homogenous mixture. For example, the liquid admixture may be added to the hydraulic binder at the entry of a mill, such as a ball mill, in which the binder (together with the admixture) is ground to obtain a fine binder powder homogenously mixed with the admixture. Alternatively, a particulate carrier may be impregnated with the liquid admixture, whereupon the impregnated carrier is mixed with the hydraulic binder.

According to a preferred embodiment, the premix is provided in powder form.

Preferably, the hydraulic binder comprises Portland cement.

Further, the hydraulic binder may also comprise other mineral components, in particular ground granulated blast furnace cement, preferably at a content comprised between 70 and 90 wt.-% of the total hydraulic binder, or fly ash, preferably between 40 and 70 wt.-% of the total hydraulic binder.

The suitable cement used in the invention is preferably selected among cements described according to the European NF EN 197-1 Standard of April 2012 or mixtures thereof, preferably cement of the types CEM I, CEM II, CEM III, CEM IV or CEM V.

From a cost perspective, it is desirable to minimize the content of cement in the backfill material, without impairing the mechanical, stability of the material once hardened. According to a preferred embodiment, the amount of dry premix is selected so that the backfill material has a content of hydraulic binder, in particular of Portland cement, of 2-14 wt.-%, preferably 3-6 wt.-%.

In addition to a superplasticizer and optionally a defoaming agent the premix may also contain a stabilising agent. A viscosity modifying agent is preferably used as said stabilising agent, wherein the effect of the addition of a stabilising agent is to avoid segregation and bleeding of the backfill material.

As to the selection of specific types of superplasticizer, defoaming agent and stabilising agent, the following preferred embodiments are envisaged.

Preferably, the superplasticizer is a phosphonate based admixture, or a polycarboxylate ether based admixture. Particularly goods results have been achieved with a polycarboxylate ether based admixture, which is also referred to as "PCP". The term "PCP" or "polyoxy polycarboxylate" is to be understood according to the present invention as a copolymer of acrylic acids or methacrylic acids and their esters of polyoxyethylene (POE).

Preferably, the dry premix comprises 0.5-10 wt.-%, preferably 1-6 wt.-%, more preferably 3-4 wt.-%, of a polycarboxylate ether based superplasticizer.

As to the specific type of polycarboxylate ether based superplasticizer, a preferred embodiment provides that the polycarboxylate ether based superplasticizer has a charge density of <1.5, preferably <1.8, meq/g. It was found that the flowability enhancing effect of the polycarboxylate ether based superplasticizer can be increased by selecting specific types of superplasticizers that have a relatively high charge density. The person skilled in the art knows which type of superplasticizer to select in order to lie within the preferred range of the charge density. If the dry premix comprises two or more different polycarboxylate ether based superplasticizers, the charge density is an average charge density, i.e. the charge density of the mixture of the different superplasticizers.

Preferably, the dry premix comprises 0.5-10 wt.-% of a phosphonate based superplasticizer.

The premix may contain more than one type of superplasticizer. In particular, the premix may contain both, a phosphonate based admixture and a polycarboxylate ether based admixture.

Preferably, a polyether is used as said defoaming agent.

Preferably, the dry premix comprises 0.05-2 wt.-% of a polyether based defoaming agent.

The dry premix may comprise 0.2-2 wt.-% of the stabilizing agent.

According to a preferred embodiment, the stabilizing agent is a diutan gum.

Preferably, the mine tailings have a solid content of 70-82 wt.-%, preferably 74-80 wt.-%.

Preferably, the mine tailings are from a mine extracting at least one of gold, silver, copper, zinc, uranium, platinum, palladium, nickel, beryllium, cobalt, chromium, gallium, indium, lead, lithium, magnesium, manganese, molybdenum, aluminium, barium, antimony, bismuth, tantalum, titanium, tungsten, vanadium, zinc, iron, diamonds, sapphires, opals, emeralds, rubies, graphite, alexandrite, aquamarines, spinel, topaz, cadmium, potash, molybdenum, a rare earth element and a platinum group metal.

EXAMPLES

The present invention will now be illustrated in more detail by reference to the following examples.

Materials

The following notation is used to describe the samples used in the following examples:

C4-CEM III-PD 78-Br5-PCP1 4.5

Where:
C4 is the tailings sample
CEM III is the hydraulic binder
PD is the solids content (also referred to as pulp density) (weight %)
Br is the binder content (weight %)
PCP1 is a superplasticizer
4.5 is the amount of PCP1 (weight % in the binder The pulp density corresponds to the percentage of solids fractions in the backfill material.

Several types of admixtures have been tested with various dosages:
PCP1 to PCP5 are various superplasticizers, described in detail in the table below,
PE1 is a polyether used as defoaming agent,
DG1 is a diutan gum used as stabiliser,
PN1 is a phosphonate used as a superplasticizer.

|  | Function | Chemical nature | Form | Solid content (wt.-%) | Charge density (meq/g) |
|---|---|---|---|---|---|
| PE1 | Defoaming agent | Polyether | Powder | 100 | N.A. |
| PN1 | Plasticizer | Diphosphonate | Liquid | 30 | N.A. |
| PCP1 | Plasticizer | Methacrylic Polycarboxylate ether | Liquid | 20 | 1.1 |
| PCP2 | Plasticizer | Cationic polymer | Liquid | 50 | N.A. |
| PCP3 | Plasticizer | Methacrylic Polycarboxylate ether | Liquid | 20 | 1.6 |
| PCP4 | Plasticizer | Polycarboxylate ether | Powder | 100 | 1.55 |
| PCP5 | Plasticizer | Polycarboxylate ether | Powder | 100 | 1.86 |

Several types of tailings were tested:
Can1, are tailings coming from a zinc mine in Canada.
Mal1, are tailings coming from a gold mine in Mali.
DRC1 are tailing coming from a gold mine in DRC.
C4 is a siliceous filler that has a similar particle size distribution than common tailings.

Process of Preparation of Cemented Paste Backfills

In laboratory, for examples 1 to 4, the cemented paste backfill samples were prepared according to the following procedure:

Mine tailings, the dry premix of the invention and water are poured into in a 2-litre bowl of a mortar mixer.

The mixer is started at low speed (50 rpm) and within the first 30 seconds all the mixing water is added.

After 5 minutes of mixing the mixer is stopped.

For examples 5 and 6, cemented paste backfill samples were made with a concrete mixer according to the same mixing procedure. This concrete mixer was equipped with a 20 litres bowl. 10 litres (around 20 kg) of cemented paste backfill was mixed.

Measurement Methods

For examples 1 to 4, fluidity of the paste was measured just after mixing and at various testing times after mixing (up to 2 hours) with a methyl methacrylate (MMA) cone of 20 mm upper diameter, 40 mm lower diameter and 58 mm height. Its total volume is 40.3 mL. The cone is shown in FIG. 1.

The cone was filled in with a single layer of cemented paste backfill. The paste was cut at the top surface with a spatula then the cone was lifted and the material was allowed to spread onto a slightly wet glass plate.

The diameter of the backfill was measured in millimetres on two diameters after stabilization of the spreading. The resulting flow value is the main value of the two measurements.

For example 5, the Abrams cone (100/200 mm diameter, 300 mm height) test was used to follow the evolution of fluidity of the paste as function of time.

Unconfined Compressive Strength has been measured on undrained 5×5×5 cm cemented paste backfill cubes at various testing ages. The moulds were filled with a single layer of cemented paste backfill. The top surface of the paste was cut and smoothed. Cubes were cured in moulds at 35° C. and 100% relative humidity until the testing ages. Samples were broken at a rate of compression of 2 mm/min.

The charge density of the polycarboxyies is defined as the number of charges present on the polymer. This number is expressed in meq/g, corresponding as the moles of charges per gram of polymer in the superplasticizer.

The charge density is here measured by electrometric titration, using an automatic titration device: Titrando 808, Dosino 800 and stirrer 801, supplied by Metrohm. The software Tiamo from Metrohm is used to carry out the measurement and process the measured data in order to calculate the charge density.

To measure the charge density, two consecutive titrations are required; a first one with a strong acid, such as chloric acid, and another with a strong base, such as sodium hydroxide. The purpose of the first titration is to make sure that ail the charges of the polymer are protonated. The second titration enables to determine the equivalence points used for the calculation of the charge density.

The following experimental protocol is used:
A mixture of 10 g of superplasticizer is added to a beaker, and diluted with 70 mL of deionised water,
The mixture is continuously stirred using a magnetic bar and stirrer, The pH electrode, calibrated prior to the measurement, is placed into the solution and continuously measures the pH, A solution of chloric acid 0.1N+/−0.2% is slowly added to the mixture and the pH is measured as a function of the volume of said solution added, A solution of sodium hydroxide 0.1N+/−0.2% is slowly added to the mixture and the pH is measured as a function of the volume of said solution added.

The titration device then computes the charge density of the polymer by plotting the measured pH as a function of the volume of sodium hydroxide, and determining the two equivalence points $V_{eq1}$ and $V_{eq2}$. The charge density is finally calculated using software Tiamo, using the following mathematical formulae:

$$CD = [NaOH] \cdot (V_{eq2} - V_{eq1})/M_{PCP}$$

Where: CD is the charge density (in meq/g),

[NaOH] is the concentration of sodium hydroxide in the solution added (in mol/L), $V_{eq1}$ and $V_{eq2}$ are the two equivalence points (in L), $M_{PCP}$ is the weight of polycarboxylate in the superplasticizer (in g of dry polymer).

EXAMPLE 1

Flow of Reference Backfill Materials

Without any admixture being used, backfill materials made of C4 or tailings Can1 or Mal1 have low flow values.

| Sample | Flow (mm) after 120 min |
| --- | --- |
| C4 - CEM III - PD78 - Br 5 | 40 |
| Can1 - CEM III - PD74 - Br 5 | 50 |
| Mal1 - CEM III - PD80 - Br 5 | 50 |

EXAMPLE 2

Flow of Backfill Materials with Plasticizers, without Any Stabiliser

The best flow is obtained with PCP admixtures, at a dosage of 3.5 wt.-% of the amount of binder, here a CEM III. The phosphonate admixture PN1 requires higher dosages to be effective, i.e. 2.5 wt.-%.

From this example, PCP1 is a preferred admixture.

| Sample | Flow (mm) after 120 min |
| --- | --- |
| C4 - CEM III - PD78 - Br 5 (reference) | 40 |
| C4 - CEM III - PD78 - Br 5 - PCP1 at 1.2 wt.-% | 70 |
| C4 - CEM III - PD78 - Br 5 - PCP1 at 3.5 wt.-% | 150 |
| C4 - CEM III - PD78 - Br 5 - PN1 at 1.2 wt.-% | 40 |
| C4 - CEM III - PD78 - Br 5 - PN1 at 2.5 wt.-% | 40 |
| C4 - CEM III - PD78 - Br 5 - PN1 at 3.5 wt.-% | 100 |

EXAMPLE 3

Flow of Backfill Materials with Plasticizers and with a Stabiliser

The addition of PCP4 at 1 wt.-% and DG1 at 0.5 wt.-% is enough to multiply the flowability by more than two, while a mixture of 4.5 wt.-% PCP2 and 10 wt.-2 PCP3 and 0.5 wt.-% DG1 results in only twice the flowability when compared to the reference. PCP4 alone is able to achieve a better performance than the combination of PCP2 and PCP3. From this example, PCP4 is preferred over PCP2 and PCP3 for this invention.

| Sample | Flow (mm) after 120 min |
| --- | --- |
| Can1 - CEM III - PD74 - Br 5 (reference) | 50 |
| Can1 - CEM III - PD74 - Br 6 - PCP2 4.5 - PCP3 10 - DG1 0.5 | 100 |
| Can1 - CEM III - PD75 - Br5 - PCP4 1 - DG1 0.5 | 120 |

EXAMPLE 4

Flow of Backfill Materials with Various Admixtures

With 2.5 wt.-% PCP5 the flowability of the cemented paste backfill material is multiplied by nearly three. The addition of 0.1 wt.-% PE1 further improves the flow.

This example shows that polycarboxylate ether based plasticizers are particularly suitable for the invention, used alone. The addition of a defoaming agent further increases the flow.

The addition of PCP increases the amount of entrained air in the cemented paste backfill material and penalizes mechanical performances. PE1 is a defoaming agent added to limit this negative effect. It is, however, surprising that the addition of a defoaming agent increases the flowability, since entrained air usually promotes flowability so that it would have been expected that the addition of the defoaming agent has a negative effect on flowability.

| Sample | Flow (mm) after 120 min |
| --- | --- |
| Mal1 - CEM III - PD80 - Br 5 (reference) | 50 |
| Mal1 - CEM III - PD80 - Br 5 PCP5 2.5 wt.-% | 130 |
| Mal1 - CEM III - PD80 - Br 5 PCP5 2.5 wt.-% - PE1 0.1 wt.-% | 140 |
| Mal1 - CEM III - PD80 - Br 5 PCP5 2.0 wt.-% | 110 |

EXAMPLE 5

Evolution of Flow Over Time

Figure 2:
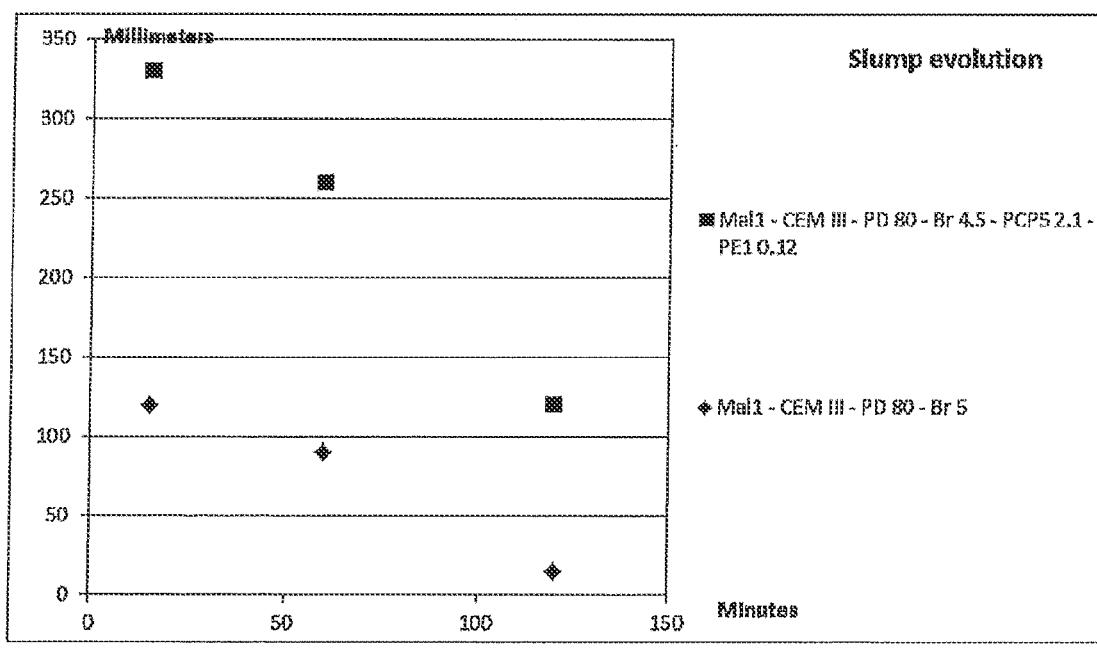
FIG. 2 shows the flowability of cemented paste backfill materials as a function of time according to an embodiment of the invention.

The flowability of the cemented paste backfill material as a function of time decreases, as shown in FIG. 2. However, the addition of PCP5 improves the flow sufficiently to allow the transportation of the cemented paste backfill material for a duration of 120 minutes.

PCP 5 is therefore particularly suitable for this invention. It is assumed that the high charge density of PCP 5 contributes to the increased flowability.

EXAMPLE 6

Impact of the Admixtures on Mechanical Properties of Backfills

Figure 3:
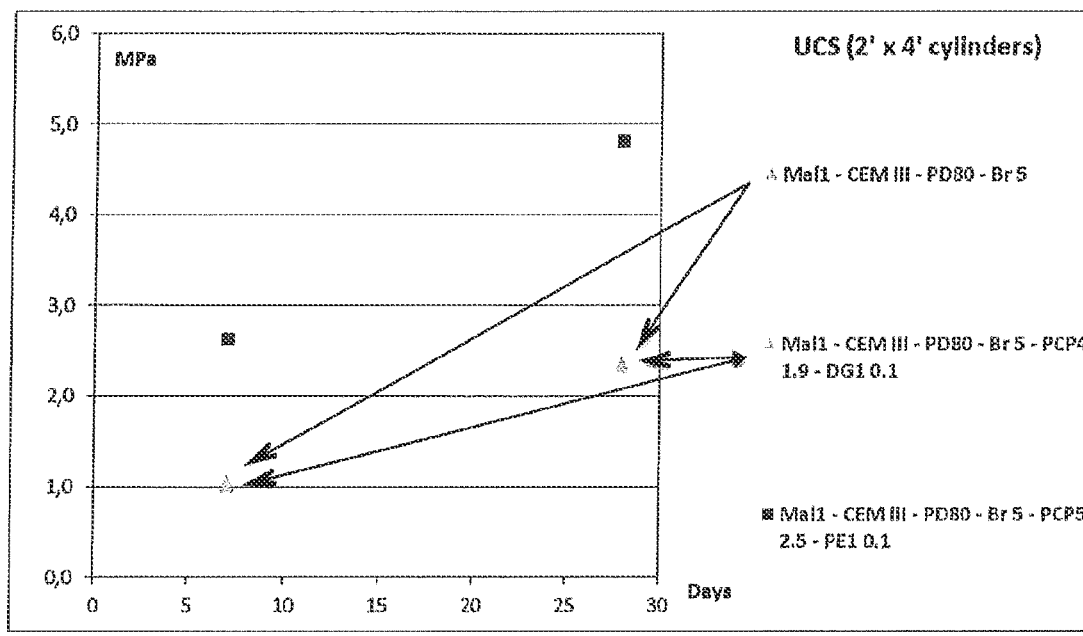
FIG. 3 shows the mechanical strength as a function of times of cemented paste backfill materials according to an embodiment of the invention.

The addition of PCP5 and PE1 significantly improves the mechanical strength at both early and medium terms while PCP4 does not improve strength, as shown in FIG. 3.

The invention claimed is:

1. A process of preparing a cemented paste backfill material, said material comprising ground mine tailings, a hydraulic binder and water, wherein solids content of the backfill material is 70-82 wt.-%, the process comprising:
   a) providing a dry premix, said premix comprising the hydraulic binder, a superplasticizer and optionally a defoaming agent,
   b) mixing said dry premix with the ground mine tailings and water, wherein the premix is provided in powder form.

2. The process according to claim 1, wherein the hydraulic binder comprises Portland cement.

3. The process according to claim 1, wherein the hydraulic binder comprises ground granulated blast furnace cement at a content comprised between 70 and 90 wt.-% of the total hydraulic binder, or fly ash between 40 and 70 wt.-% of the total hydraulic binder.

4. The process according to claim 1, wherein the amount of dry premix is selected so that the backfill material has a content of hydraulic binder of 2-14 wt.-%.

5. The process according to claim 1, wherein the dry premix additionally comprises a stabilising agent.

6. The process according to claim 1, wherein the superplasticizer is a phosphonate based admixture, or a polycarboxylate ether based admixture.

7. The process according to claim 6, wherein the dry premix comprises 0.5-10 wt.-% of a polycarboxylate ether based superplasticizer.

8. The process according to claim 6, wherein the polycarboxylate ether based superplasticizer has a charge density of >1.5 meq/g.

9. The process according to claim 6, wherein the dry premix comprises 0.5-10 wt.-% of a phosphonate based superplasticizer.

10. The process according to claim 1, wherein a polyether is used as said defoaming agent.

11. The process according to claim 10, wherein the dry premix comprises 0.05-2 wt.-% of a polyether based defoaming agent.

12. The process according to claim 5, wherein the stabilizing agent is a diutan gum.

13. The process according to claim 5, wherein the dry premix comprises 0.2-2 wt.-% of the stabilizing agent.

14. The process according to claim 1, wherein the mine tailings have a solid content of 70-82 wt.-%.

15. The process according to claim 1, wherein the mine tailings are from a mine extracting at least one of gold, silver, copper, zinc, uranium, platinum, palladium, nickel, beryllium, cobalt, chromium, gallium, indium, lead, lithium, magnesium, manganese, molybdenum, aluminium, barium, antimony, bismuth, tantalum, titanium, tungsten, vanadium, iron, diamonds, sapphires, opals, emeralds, rubies, graphite, alexandrite, aquamarines, spinel, topaz, cadmium, potash, a rare earth element and a platinum group metal.

16. The process according to claim 1, wherein the solids content of the backfill material is 74-80 wt.-%.

17. The process according to claim 4, wherein the amount of dry premix is selected so that the backfill material has a content of Portland cement of 2-14 wt.-%.

18. The process according to claim 4, wherein the amount of dry premix is selected so that the backfill material has a content of hydraulic binder of 3-6 wt.-%.

19. The process according to claim 7, wherein the dry premix comprises 1-6 wt.-% of a polycarboxylate ether based superplasticizer.

* * * * *